Patented June 17, 1947

2,422,371

UNITED STATES PATENT OFFICE 2,422,371

RUBBERLIKE BUTADIENE COPOLYMERS

Frank K. Schoenfeld, Silver Lake, Ohio, assignor to The B. F. Goodrich Company, New York, N. Y., a corporation of New York No Drawing. Application March 5, 1941, Serial No. 381,877

7 Claims. (Cl. 260—84.5)

This invention relates to rubber-like copolymers and to a method for preparing the same. More particularly it relates to the preparation of useful rubber-like copolymers by the copolymerization of a mixture of unsaturated organic compounds containing a high proportion of a conjugated diene hydrocarbon such as butadiene. The principal object of the invention is to provide new butadiene copolymers, particularly rubber-like materials having high elasticity, low permanent set and high tensile strength which are especially desirable for use in the production of tires.

Many rubber-like copolymers prepared by the polymerization of a mixture containing butadiene and some other compound copolymerizable therewith, known as comonomer, have already been disclosed. For examples, U. S. Patent 1,973,000 of Konrad and Tschunkur discloses a copolymer of butadiene and acrylonitrile, U. S. Patent 1,938,731 of Tschunkur and Bock discloses a copolymer of butadiene and styrene, British Patent 370,822 discloses copolymers of butadiene with certain acrylic esters, particularly methyl acrylate and butyl acrylate and U. S. Patent 2,218,362 of Starkweather and Collins as well as British Patent 485,941 disclose a copolymer of butadiene and methyl methacrylate. However, in all these examples of the production of butadiene copolymers as shown by the prior art, it is necessary to employ appreciable proportions of the comonomer, about 25 to 50% by weight of the mixture or about one molecular proportion of the comonomer for two or three of butadiene in order to obtain a useful rubber-like copolymer. When a smaller proportion of the comonomer is employed the product resembles polybutadiene and does not possess sufficient strength to be of use as a replacement for natural rubber, while, on the other hand, if the comonomer is employed in a larger proportion the product is resinous and stiff rather than rubberlike and is not elastic or plastic enough to take the place of natural rubber. In view of this fact and the further fact that the comonomer is much more expensive than butadiene, it would be extremely desirable to discover a compound which would yield a rubber-like copolymer having desirable properties when copolymerized with butadiene in proportions materially lower than those necessary with previously known comonomers.

After extensive tests with a large number of materials which conceivably might be capable of copolymerizing with butadiene, I have discovered that alkyl esters of methacrylic acid which contain from 2 to 5 carbon atoms in the alcohol radical may be copolymerized with butadiene and that a rubber-like copolymer having the desirable properties sought for may be obtained by the polymerization of monomer mixtures containing only small proportions of the ester. Specifically I have discovered that ethyl methacrylate, propyl methacrylate, isopropyl methacrylate, butyl methacrylate, isobutyl methacrylate or amyl methacrylate may be copolymerized with butadiene in proportions as high as 15 molecular proportions of butadiene to only 1 molecular proportion of the ester to produce rubber-like copolymers having mechanical strength and plasticity equivalent to that of known butadiene copolymers which are prepared using much larger proportions of the comonomer, and having greater rebound, elasticity and lower permanent set than such known rubber-like copolymers.

It is recognized that copolymers of butadiene and methyl methacrylate are known. It is also recognized that polymers of both methyl methacrylate and methacrylic esters having from 2 to 5 carbon atoms in the alcohol radical are known. Moreover, it is known that polymers of methyl methacrylate alone are far superior to the polymers of other methacrylic esters. For example, Hill in U. S. Patent 1,980,483 states that the polymers of methyl methacrylate are far superior to the polymers of ethyl methacrylate and Röhm and Bauer in U. S. Patent 2,193,742 state that the tensile strength and hardness of polymerized methacrylic esters decrease as the number of carbon atoms in the alcohol radical is increased. By this invention, I have discovered, however, that the copolymers of butadiene with ethyl methacrylate or with other methacrylic esters having from 2 to 5 carbon atoms in the alcohol radical are equal or even superior to the copolymers of butadiene with methyl methacrylate, and that these copolymers may be prepared with a much smaller proportion of the ester.

As is the case with other copolymeric systems the specific properties of the copolymers prepared from butadiene and alkyl methacrylates containing from 2 to 5 carbon atoms in the alcohol radical, in accordance with this invention, may be varied somewhat by varying the relative proportions of the two components. In general, rubber-like copolymers are obtained from the copolymerization of mixtures containing from about 2 to about 15 molecular proportions of a conjugated butadiene hydrocarbon to one molecular proportion of the ester. To secure the best results however and at the same time to effect a saving in the amount of comonomer necessary it is preferable to employ from about 5 to 12 moles of butadiene per mole of the ester.

The copolymerization of the mixture of butadiene with the alkyl methacrylate may be carried out for the most part by standard methods for the production of rubber-like butadiene copolymers. Thus, copolymerization in aqueous emulsion is preferred although copolymerization in homogeneous systems may also be employed. In the emulsion copolymerization process the mixture of monomers is emulsified with water with the aid of a suitable emulsifying agent, other substances which favorably influence the polymerization reaction or which improve the properties of the copolymer such as polymerization initiators, polymerization catalysts, polymerization modifiers and the like are added to the emulsion, and the emulsion is allowed to polymerize by agitating the same continuously at a suitable temperature, usually from 20 to 60° C. for a time sufficient to complete the reaction, about 10 to 100 hours usually being required. The copolymer is thus obtained in the form of an aqueous dispersion resembling natural rubber latex to which an age resister or antioxidant may be added if desired and which may then be utilized as such or coagulated by the same methods used to coagulate natural rubber latex for example by addition of acid, alcohol or salts or by a combination of these methods. The copolymerization products are washed and dried to produce a crude rubber-like material which may be processed, compounded, and vulcanized in substantially the same manner as natural rubber.

The following examples will illustrate the process but are not intended to limit the scope of the invention.

Example I

One hundred parts by weight of a monomer mixture containing butadiene and ethyl methacrylate in the ratio of five molecular proportions of butadiene to one of ethyl methacrylate are emulsified with 250 parts of a 2% aqueous solution of myristic acid which has been 85% neutralized with caustic soda. Ten parts of a 3½% aqueous solution of hydrogen peroxide are added as an initiator of polymerization, 1 part of the complex salt sodium ferri pyrophosphate is added to accelerate the polymerization and 0.3 part of diisopropyl dixanthogen disulfide is added as a polymerization modifier. The emulsion is allower to copolymerize by agitation for 21 hours at a temperature of 40° C. Two parts of phenyl-beta-naphthylamine are added to the latex-like dispersion resulting from the polymerization and the dispersion is coagulated with a mixture of alcohol and salt. A 95% yield of a plastic, elastic rubber-like material is obtained. The material may be masticated without difficulty on either a hot or cold mill and may otherwise be processed in the same manner as natural rubber. When the material is compounded in a typical tire tread recipe and then vulcanized it yields an excellent vulcanizate having a tensile strength of 4100 lbs. per sq. in. and an ultimate elongation of 640%. The cured stock also has a low permanent set, high rebound elasticity and is somewhat resistant to swelling by solvents, the swelling in acetone being unusually low. Automobile tires which are the equivalent of tires made of natural rubber and which in some respects are even superior to tires made of natural rubber may be made from this material.

Example II

One hundred parts by weight of a monomer mixture containing ten molecular proportions of butadiene to one of butyl methacrylate are emulsified with 250 parts of a 3% solution of sodium myristate; .15 part of hydrogen peroxide, .50 part of sodium ferri pyrophosphate and .45 part of a polymerization modifier are added, and the emulsion is allowed to copolymerize for 40 hours at a temperature of 40° C. Upon coagulation of the latex resulting from the copolymerization a strong elastic rubber-like product is obtained. When compounded and vulcanized this product gives a vulcanizate which is equal in tensile strength to a similar vulcanizate of a copolymer prepared from a mixture of butadiene and methyl methacrylate in which the monomer ratio was three moles of butadiene for one mole of methyl methacrylate.

It is to be understood that other emulsifying agents, initiators, accelerators and modifiers may be substituted in the above examples with equally good results. As emulsifying agents a number of substances which are capable of forming a stable emulsion of the monomers in water may be employed. Ordinary soaps such as the sodium or potassium salts of saturated or unsaturated fatty acids or mixtures of these, for example, sodium myristate, sodium palmitate, sodium oleate and the like, either completely neutralized and containing some free fatty acid, or synthetic saponaceous materials such as hymolal sulfates or sulfonates, aromatic sulfonates, and salts of high molecular weight aliphatic bases; for examples, sodium lauryl sulfate, soduim naphthalene sulfonate, diethylaminoethyloleyl amide hydrochloride, cetyl trimethyl ammonium methyl sulfate, cetyl piperidinium methyl sulfate or some other emulsifying agent may be employed. The emulsion, depending upon the emulsifying agent and the particular polymerization initiator and polymerization catalysts employed, may be either alkaline or acid since polymerization can be conducted over a wide range of pH. Alkaline emulsions, however, are preferred.

As initiators of polymerization and well known oxygen yielding compounds such as hydrogen peroxide, benzoyl peroxide, potassium persulfate, sodium perborate and the like may be employed as may also other polymerization initiators such as sulfur dioxide, diazoamino benzene and the like. Polymerization catalysts such as carbon tetrachloride or trichloro acetic acid may be present if desired. Other polymerization catalysts in addition to the sodium ferri pyrophosphate, used in the examples above, which are effective in increasing the yield and decreasing the time necessary to complete the polymerization, include a large number of so-called redox systems which contain small proportions of a heavy metal in combination with a wide number of organic or inorganic compounds, which combinations are disclosed more fully in copending applications of William D. Stewart, Serial Nos. 379,712, 379,713, 379,714, 379,715, 379,716 and 379,717, filed February 19, 1941. Polymerization modifiers such as dialkyl dixanthogens, diaryl disulfides, and other organic sulfur containing compounds which increase the plasticity and solubility of the copolymer may also be employed in the emulsion polymerization process of this invention as described in the specific examples above.

Although the invention has been described with particular reference to butadiene copolymers it is to be understood that other conjugated butadiene hydrocarbons such as isoprene and dimethyl butadiene may be substituted for a part or all of the butadiene. Then too, other comonomers known to the art such as acrylonitrile, styrene and vinylidene chloride may be included in the mixture of butadiene and the alkyl methacrylic esters of this invention before polymerization, if desired.

The products of this invention are useful in the rubber art for practically all purposes for which natural rubber and other known rubber-like materials may be used. Compounding and vulcanizing of the crude rubber-like products to produce vulcanized articles is carried out in the usual manner and will be apparent to those skilled in the art. The copolymers of this invention are particularly useful to the art since smaller proportions of the comonomer are employed in the production of the copolymer than has heretofore been possible while equally good and, in some respects, surprisingly better copolymers are obtained.

I claim:

1. A rubber-like copolymer obtained by the copolymerization of a mixture containing from two to about fifteen molecular proportions of a conjugated butadiene hydrocarbon to one molecular proportion of an alkyl ester of methacrylic acid which contains from two to five carbon atoms in the alkyl radical.

2. A rubber-like copolymer obtained by the emulsion copolymeriaztion of a mixture containing from two to about fifteen molecular proportions of butadiene to one molecular proportion of an alkyl ester of methacrylic acid which contains from two to five carbon atoms in the alkyl radical.

3. A rubber-like copolymer obtained by the emulsion copolymerization of a mixture containing from two to fifteen molecular proportions of butadiene to one molecular proportion of butyl methacrylate.

4. The process which comprises copolymerizing a mixture containing from two to about fifteen molecular proportions of a conjugated butadiene hydrocarbon to one molecular proportion of an alkyl ester of methacrylic acid which contains from two to five carbon atoms in the alkyl radical.

5. The process which comprises copolymerizing in aqueous emulsion a mixture containing from two to about fifteen molecular proportions of butadiene to one molecular proportion of an alkyl ester of methacrylic acid which contains from two to five carbon atoms in the alkyl radical.

6. The process which comprises copolymerizing in aqueous emulsion a mixture containing from two to fifteen molecular proportions of butadiene to one molecular proportion of butyl methacrylate.

7. The process which comprises copolymerizing in aqueous emulsion a mixture containing from five to twelve molecular proportions of butadiene to one molecular proportion of butyl methacrylate.

FRANK K. SCHOENFELD.

REFERENCES CITED

The following references are of record in the file of this patent:

UNITED STATES PATENTS

| Number | Name | Date |
|---|---|---|
| 2,232,515 | Arnold | Feb. 18, 1941 |
| 2,161,039 | Habgood | June 6, 1939 |
| 2,227,900 | Habgood | Jan. 7, 1941 |
| 2,235,625 | Wolfe | Mar. 18, 1941 |
| 2,256,148 | Lichty | Sept. 16, 1941 |
| 2,279,293 | Clifford | Apr. 14, 1942 |

FOREIGN PATENTS

| Number | Country | Date |
|---|---|---|
| 485,941 | Great Britain | May 25, 1938 |